March 9, 1965  E. B. ROXSTRÖM  3,172,488
DEVICE FOR DEFLECTING DRILL HOLES IN DIAMOND DRILLING
Filed Feb. 8, 1963

Inventor
Eric Bertil Roxström
by Sommers & Young
Attorneys 3,172,488
DEVICE FOR DEFLECTING DRILL HOLES IN DIAMOND DRILLING
Eric Bertil Roxström, Broddgrand 17, Hagersten, Sweden
Filed Feb. 8, 1963, Ser. No. 257,147
Claims priority, application Sweden, Feb. 12, 1962, 1,525/62
4 Claims. (Cl. 175—81)

The invention relates to a device for deflecting drill holes in diamond drilling.

For deflecting diamond drill holes it is known principally to use long steel wedges for guiding a special drill tool, by means of which the wall of the drill hole is reamed in the desired direction. However, this has been associated with several disadvantages, i.e. the drill tool has tended to slide off from the steel wedge so that the reaming has occurred laterally of the desired direction, and further the wear of the drill tool and the steel wedge has been considerable.

An object of the invention therefore is to eliminate laterally occurring reaming such as performed with devices including long steel wedges.

Another object of the present invention is to provide a deflection device for correcting deviations in drill holes but also for other purposes, e.g. passing obstacles in drill holes as wedged tools or the like, wherein no drill distance is lost and without any substantial loss of core in core drilling.

A further object of the invention is to provide a deflection device which eliminates unnecessary wear of the diamonds.

Still another object of the invention is to provide a deflection device which after the deviating operation can be withdrawn from the drill hole as a unit without leaving any parts in the hole.

Figure 1:
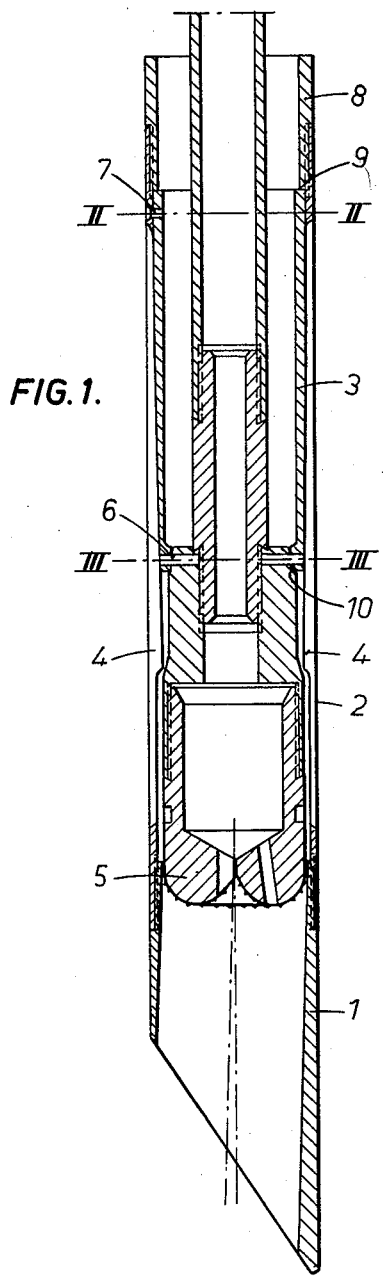
Figure 2:
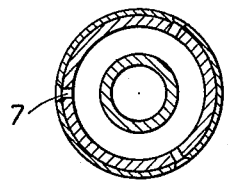
Figure 3:
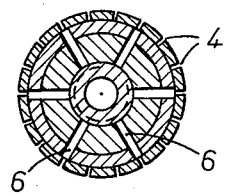

Further objects and features of the invention will appear from the following specification when read in conjunction with the accompanying drawings, in which a preferred embodiment is illustrated by way of example and in which:

FIG. 1 is a longitudinal section of the device according to the invention; FIGS. 2 and 3 are cross-sectional views through the same taken along the lines II—II and III—III in FIG. 1, respectively.

Referring to the drawing the device according to the invention comprises a cylindrical deflection tube 1 arranged to be introduced into a drill hole to the bottom of the same and having substantially the same diameter as the drill hole. The deflection tube 1 is formed with an internal peripheral surface, the axis of which is at a small angle to the axis of the external peripheral surface. As it has turned out that when deflecting a drill hole one may not deviate a too great angle if the risks for returning to the original direction by bending the drill pipe shall be avoided, the angle between the axes of the internal and external peripheral surfaces preferably amounts only to 0.5–2.5° and to 1.0–1.5°. At the end facing the drill hole bottom the deflection tube is also obliquely cut in a plane having a smaller angle to the axis of the external peripheral surface than to the axis of the internal peripheral surface, i.e. that the mouth of the tube faces the same direction as the internal peripheral surface of the tube deviates from the external peripheral surface of the same.

At the end of the deflection tube remote from the drill hole bottom, said tube is connected to an expander device. Said device comprises an expander sleeve 2 having substantially the same diameter as the deflection tube 1 and threaded or otherwise secured to the same, and an expander tube 3. The expander sleeve 2 is provided with a plurality of equally spaced axial slots 4 and formed with an internal peripheral surface conically tapered towards the deflection tube. The expander tube 3 in its turn is formed with an external peripheral surface likewise conically tapered towards the deflection tube.

The deflection tube 1 and the expander device 2, 3 are arranged to be introduced into the drill hole supported by a full-nose bit 5 disposed in said elements, to which bit the expander tube 3 is disengageably connected by a number of locking pins 6 equally spaced around the periphery and disposed in holes in the expander tube 3 and the rear portion of the full-nose bit 5. When the deflection tube has reached the bottom of the drill hole and an axial pressure towards said bottom is applied on the full-nose bit 5, said bit will thereby drag along the expander tube 3 of the expander device and cause the expander sleeve 2 to expand by the cooperation between the tapered peripheral surfaces of the two tubes so as to rigidly secure the expander sleeve and the deflection tube 1 connected thereto in the drill hole. The locking pins 6 are made of e.g. aluminum and so designed that they are sheared off when applying an axial pressure to the full-nose bit 5 greater than the pressure necessary for securing the expander device, whereby the full-nose bit 5 is released and can be brought up to the mouth of the deflection tube 1 and guided by the inner peripheral surface of the same at the subsequent drilling.

In order to prevent an unintentional release of the expander device, if the deflection tube 1 during the introduction in the drill hole should happen to get caught by roughnesses or obstacles before the bottom of the drill hole is reached, the two parts of the expander device are suitably joined by means of carrying pins 7, which preferably also are made of aluminum and so designed as to be sheared off at a relatively low axial pressure on the full-nose bit 5 towards the drill hole bottom for releasing the expander device. In all circumstances they must be sheared off for a substantial lower pressure than the locking pins 6.

For making it possible to withdraw the device as a whole from the drill hole without leaving any parts, the expander sleeve 2 is connected at its end remote from the deflection tube to a hoist-ring 8 formed with a shoulder 9 for limiting the axial movement of the expander tube 3 in the direction away from the deflection tube 1. Moreover the full-nose bit 5 is at its end remote from the drill hole bottom provided with an abutment 10 arranged to engage the end of the expander tube 3 directed towards the drill hole bottom at the withdrawal of the full-nose bit 5. Thereby the expander tube 3 will accompany the movement of the full-nose bit when withdrawing the same, so that the expander sleeve 2 at first is released from the drill hole wall and the expander tube 3 then abuts the shoulder 9, after which the complete device can be withdrawn together with the full-nose bit 5.

The method for deflecting drill holes when using the device according to the present invention is the following: The full-nose bit, with the deflection device mounted, is inserted into the drill hole in the usual manner with the mouth of the deflection tube 1 oriented for deflection in the desired direction. When the deflection tube 1 has reached the drill hole bottom, a first relatively low axial pressure towards the drill hole bottom is applied to the full-nose bit 5 so as to shear off the supporting pins 7. The expander tube 3 is thereby released from the expander sleeve 2, so that said tube is carried towards the drill hole bottom through the expander sleeve 2. By the cooperation between the tapered peripheral surfaces of the expander device the expander sleeve 2 and the deflection tube 1 connected thereto are then secured to the drill hole wall in the desired angular position. A higher axial pressure is thereafter applied to the full-nose bit towards the drill hole bottom, whereby the locking pins 6 are sheared off and the full-nose bit is released from the expander device.

With the full-nose bit 5 guided for deflection in the desired direction by the internal peripheral surface of the deflection tube 1, it is then drilled only so short a distance as is sufficient for providing a directional guiding or about 0.1–0.2 m. The full-nose bit 5 is withdrawn, the deflection device accompanying as a whole by the cooperation between the abutment 10 on the full-nose bit 5, the expander tube 3 and the shoulder 9 on the hoist-ring 8, and is replaced by a preferably single core pipe with a bit having substantially the same dimension as the full-nose bit 5. With this bit it is drilled a larger distance, suitably about 2–4 m., and the deflected drill hole is finally expanded by a core drill bit having substantially the same diameter as the original hole and equipped with a pilot.

The invention is not limited to the embodiment described above but can be modified within the scope of the appended claims as evident to the artisan.

I claim:

1. A device for deflecting drill holes in diamond drilling, comprising a cylindrical deflection tube for introduction into a drill hole to the bottom of said hole and having substantially the same diameter as said hole, the axis of the internal peripheral surface of said deflection tube being at a small angle to the axis of the external peripheral surface of said tube and the end of said deflection tube facing the bottom of said drill hole being obliquely cut in a plane lying at a smaller angle to the axis of said external peripheral surface of said tube than to the axis of the internal peripheral surface of same, an outer cylindrical expander sleeve connected to said cylindrical deflection tube at the end of the same remote from the bottom of said drill hole for securing said tube to the wall of said drill hole and having substantially the same diameter as said deflection tube, said cylindrical expander sleeve being formed with a plurality of axial slots and having an internal peripheral surface conically tapering towards said deflection tube, an expander tube disposed within said cylindrical expander sleeve and formed with an external peripheral surface conically tapering towards said deflection tube for co-operation with the conically tapering internal peripheral surface of said cylindrical expander sleeve thereby to expand said expander sleeve and secure the same and said deflection tube to the wall of said drill hole in a predetermined angular position upon an axial movement of said expander tube towards the drill hole bottom relatively to said cylindrical expander sleeve, a full-nose bit disposed within said deflection tube and said expander tube for performing at least a first portion of the succeeding drilling operation in the desired direction deviating from the original direction of said drill hole while guiding said full-nose bit by the internal peripheral surface of said deflection tube, and releasable locking means for connecting said full-nose bit with said expander tube during introduction of the device into said drill hole.

2. A device for deflecting drill holes in diamond drilling, comprising a cylindrical deflection tube for introduction into a drill hole to the bottom of said hole and having substantially the same diameter as said hole, the axis of the internal peripheral surface of said deflection tube being at a small angle to the axis of the external peripheral surface of said tube and the end of said deflection tube facing the bottom of said drill hole being obliquely cut in a plane lying at a smaller angle to the axis of said external peripheral surface of said tube than to the axis of the internal peripheral surface of same, an outer cylindrical expander sleeve connected to said cylindrical deflection tube at the end of the same remote from the bottom of said drill hole for securing said tube to the wall of said hole and having substantially the same diameter as said deflection tube, said cylindrical expander sleeve being formed with a plurality of axial slots and having an internal peripheral surface conically tapering towards said deflection tube, an expander tube disposed within said cylindrical expander sleeve and formed with an external peripheral surface conically tapering towards said deflection tube for co-operation with the conically tapering internal peripheral surface of said cylindrical expander sleeve thereby to expand said expander sleeve and secure the same and said deflection tube to the wall of said drill hole in a predetermined angular position upon an axial movement of said expander tube towards the drill hole bottom relatively to said cylindrical expander sleeve, a full-nose bit disposed within said deflection tube and said expander tube for performing at least a first portion of the succeeding drilling operation in the desired direction deviating from the original direction of said drill hole while guiding said full-nose bit by the internal peripheral surface of said deflection tube, and a plurality of locking pins interconnecting said expander tube and said full-nose bit during the introduction of the device into said drill hole while being carried by said full-nose bit, said pins allowing the expansion of said expander sleeve by means of said expander tube when the end of said deflection tube has reached said drill hole bottom and said full-nose bit is moved towards said drill hole bottom, said locking pins being adapted to be sheared off after the securing expansion of said expander sleeve to said drill hole wall at an axial pressure on said full-nose bit towards said drill hole bottom in order to release said bit for the succeeding drilling operation.

3. A device for deflecting drill holes in diamond drilling, comprising a cylindrical deflection tube for introduction into a drill hole to the bottom of said hole and having substantially the same diameter as said hole the axis of the internal peripheral surface of said deflection tube being at a small angle to the axis of the external peripheral surface of said tube and the end of said deflection tube facing the bottom of said drill hole being obliquely cut in a plane lying at a smaller angle to the axis of said external peripheral surface of said tube than to the axis of the internal peripheral surface of same, an outer cylindrical expander sleeve connected to said cylindrical deflection tube at the end of the same remote from the bottom of said drill hole for securing said tube to the wall of said drill hole and having substantially the same diameter as said deflection tube, said cylindrical expander sleeve being formed with a plurality of axial slots and having an internal peripheral surface conically tapering towards said deflection tube, an expander tube disposed within said cylindrical expander sleeve and formed with an external peripheral surface conically tapering towards said deflection tube for co-operation with the conically tapering internal peripheral surface of said cylindrical expander sleeve thereby to expand said expander sleeve and secure the same and said deflection tube to the wall of said drill hole in a predetermined angular position upon an axial movement of said expander tube towards the drill hole bottom relatively to said cylindrical expander sleeve, a full-nose bit disposed within said deflection tube and said expander tube for performing at least a first portion of the succeeding drilling operation in the desired direction deviating from the original direction of said drill hole while guiding said full-nose bit by the internal peripheral surface of said deflection tube, a plurality of locking pins interconnecting said expander tube and said full-nose bit during the introduction of the device into said drill hole while being carried by said full-nose bit, said pins allowing the expansion of said expander sleeve by means of said expander tube when the end of said deflection tube has reached said drill hole bottom and said full-nose bit is moved towards said drill hole bottom, said locking pins being adapted to be sheared off after the securing expansion of said expander sleeve to said drill hole wall at an axial pressure on said full-nose bit towards said drill hole bottom in order to release said bit for the succeeding drilling operation and a plurality of carrying pins for connecting said expander sleeve with said expander tube during the introduction of the device into said drill hole so as to eliminate unintended expansion of said expander sleeve by means of said expander tube before said deflection tube has reached said drill hole bottom, said carrying pins being adapted to be sheared off at an axial pressure towards said drill hole bottom on said expander tube and said full-nose bit connected thereto substantially lower than the pressure necessary for shearing off said locking pins, when said deflection tube has reached said drill hole bottom.

4. A device for deflecting drill holes in diamond drilling, comprising a cylindrical deflection tube for introduction into a drill hole to the bottom of said hole and having substantially the same diameter as said hole the axis of the internal peripheral surface of said deflection tube being at a small angle to the axis of the external peripheral surface of said tube and the end of said deflection tube facing the bottom of said drill hole being obliquely cut in a plane lying at a smaller angle to the axis of said external peripheral surface of said tube than to the axis of the internal peripheral surface of same, an outer cylindrical expander sleeve connected to said cylindrical deflection tube at the end of the same remote from the bottom of said drill hole for securing said tube to the wall of said drill hole and having substantially the same diameter as said deflection tube, said cylindrical expander sleeve being formed with a plurality of axial slots and having an internal peripheral surface conically tapering towards said deflection tube, an expander tube disposed within said cylindrical expander sleeve and formed with an external peripheral surface conically tapering towards said deflection tube for co-operation with the conically tapering internal peripheral surface of said cylindrical expander sleeve thereby to expand said expander sleeve and secure the same and said deflection tube to the wall of said drill hole in a predetermined angular position upon an axial movement of said expander tube towards the drill hole bottom relatively to said cylindrical expander sleeve, a full-nose bit disposed within said deflection tube and said expander tube for performing at least a first portion of the succeeding drilling operation in the desired direction deviating from the original direction of said drill hole while guiding said full-nose bit by the internal peripheral surface of said deflection tube, a plurality of locking pins interconnecting said expander tube and said full-nose bit during the introduction of the device into said drill hole while being carried by said full-nose bit, said pins allowing the expansion of said expander sleeve by means of said expander tube when the end of said deflection tube has reached said drill hole bottom and said full-nose bit is moved towards said drill hole bottom, said locking pins being adapted to be sheared off after the securing expansion of said expander sleeve to said drill hole wall at an axial pressure on said full-nose bit towards said drill hole bottom in order to release said bit for the succeeding drilling operation, a hoist ring secured to the end of said expander sleeve remote from said drill hole bottom and having an internal shoulder for limiting the axial movement of said expander tube away from said drill hole bottom, and an abutment formed on the end of said full-nose bit remote from said drill hole bottom for co-operation with the end of said expander tube adjacent said drill hole bottom so as to provide for withdrawal of said device as a unit out of said drill hole by means of said full-nose bit.

References Cited in the file of this patent
UNITED STATES PATENTS

| | | |
|---|---|---|
| 2,386,514 | Stokes | Oct. 9, 1945 |
| 2,498,192 | Wright | Feb. 21, 1950 |
| 2,965,182 | Galeener | Dec. 20, 1960 |